United States Patent
Whitton et al.

(10) Patent No.: US 12,533,728 B2
(45) Date of Patent: *Jan. 27, 2026

(54) SYSTEMS AND METHODS FOR REPAIRING COMPRESSOR BLADES USING HYBRID MANUFACTURING TECHNIQUES

(71) Applicant: Chromalloy Gas Turbine LLC, Palm Beach Gardens, FL (US)

(72) Inventors: James Whitton, East Burke, VT (US); Zachary Oras, Riverview, FL (US); Zachary Hopkins, San Diego, CA (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,094

(22) Filed: Sep. 26, 2023

(65) Prior Publication Data
US 2024/0082915 A1    Mar. 14, 2024

Related U.S. Application Data

(63) Continuation of application No. 17/931,500, filed on Sep. 12, 2022, now Pat. No. 11,819,920.

(51) Int. Cl.
*B22F 7/06*    (2006.01)
*B22F 5/04*    (2006.01)
(Continued)

(52) U.S. Cl.
CPC ............. *B22F 7/062* (2013.01); *B22F 5/04* (2013.01); *B22F 10/40* (2021.01); *B22F 10/66* (2021.01);
(Continued)

(58) Field of Classification Search
CPC .... B22F 5/04; B22F 7/062; B22F 7/08; B22F 10/40; B22F 10/66; B22F 10/50;
(Continued)

(56) References Cited

U.S. PATENT DOCUMENTS 4,128,929 A * 12/1978 DeMusis ................. B23P 6/002
                                                                451/365
11,819,920 B1    11/2023 Whitton et al.
(Continued)

FOREIGN PATENT DOCUMENTS

WO    2020238386 A1    12/2020

OTHER PUBLICATIONS

Notice of Allowance, dated Oct. 6, 2023, 10 pages, issued in U.S. Appl. No. 17/931,500.
(Continued)

*Primary Examiner* — Moshe Wilensky
(74) *Attorney, Agent, or Firm* — AVEK IP, LLC (57) ABSTRACT

Systems and methods are provided for repairing compressor blades using hybrid manufacturing. A mounting tool for use in repairing a turbine component includes a slot formed in the mounting tool. The slot is configured to receive the turbine component for securing the turbine component to the mounting tool. The mounting tool includes at least one fastener engageable with the turbine component and capable of retaining the turbine component within the slot; and at least a pair of support bases provided on the mounting tool. Each of the at least a pair of support bases is positioned adjacent a respect edge of the turbine component when the turbine component is retained in the mounting tool. Each of the at least a pair of support bases is configured for additively building a sacrificial support on each of the at least a pair of support bases for enabling repair of the turbine component.

23 Claims, 5 Drawing Sheets

(51) Int. Cl.
 *B22F 10/40* (2021.01)
 *B22F 10/66* (2021.01)
 *B33Y 40/20* (2020.01)

(52) U.S. Cl.
 CPC ......... *B33Y 40/20* (2020.01); *B22F 2007/068* (2013.01)

(58) Field of Classification Search
 CPC .... B22F 10/28; B22F 10/47; B22F 2007/068; B33Y 40/20; B33Y 10/00; B33Y 80/00; B23P 6/007
 See application file for complete search history.

(56) References Cited

U.S. PATENT DOCUMENTS

| | | | |
|---|---|---|---|
| 2005/0109816 A1* | 5/2005 | Swartzbeck | F01D 25/285 228/44.3 |
| 2009/0255307 A1* | 10/2009 | Davis | F01D 5/005 72/389.1 |
| 2012/0222306 A1 | 9/2012 | Mittendorf et al. | |
| 2016/0059315 A1 | 3/2016 | Baudimont | |
| 2017/0129180 A1 | 5/2017 | Coates et al. | |
| 2019/0030824 A1 | 1/2019 | Tan | |

OTHER PUBLICATIONS

Extended European Search Report, dated Feb. 28, 2024, 11 pages, received in European Patent Application No. 23196256.4.

\* cited by examiner

SYSTEMS AND METHODS FOR REPAIRING COMPRESSOR BLADES USING HYBRID MANUFACTURING TECHNIQUES

This application is a continuation of U.S. Ser. No. 17/931,500, filed Sep. 12, 2022, the entire contents of which are fully incorporated herein.

FIELD OF INVENTION

The disclosure relates generally to the repair of blades. More specifically, the disclosure relates to a tool configured for retaining a compressor blade while it is repaired using additive and subtractive manufacturing processes.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the techniques described herein relate to a mounting tool for use in repairing a turbine component, the mounting tool including a slot formed in the mounting tool, the slot configured to receive the turbine component for securing the turbine component to the mounting tool. The mounting tool includes at least one fastener engageable with the turbine component and capable of retaining the turbine component.

In some aspects, according to any one of the preceding aspects, the techniques described herein relate to a mounting tool, wherein the mounting tool includes x, y, and z orientations, and the at least one fastener includes a fastener oriented in the y orientation of the mounting tool and a second fastener oriented in the z orientation of the mounting tool.

In some aspects, according to any one of the preceding aspects, the techniques described herein relate to a mounting tool, wherein the at least one fastener includes a screw fastener.

In some aspects, according to any one of the preceding aspects, the techniques described herein relate to a mounting tool, wherein the at least one fastener oriented in the y orientation of the mounting tool is a screw fastener and the second fastener oriented in the z orientation of the mounting tool is a screw fastener.

In some aspects, according to any one of the preceding aspects, the techniques described herein relate to a mounting tool, further including an aperture configured for allowing the at least one fastener to be accessed.

In some aspects, according to any one of the preceding aspects, the techniques described herein relate to a mounting tool, wherein at least one of the at least a pair of support bases is releasably attached to the mounting tool.

In some aspects, according to any one of the preceding aspects, the techniques described herein relate to a mounting tool, wherein each of the at least a pair of support bases is releasably attached to the mounting tool.

In some aspects, according to any one of the preceding aspects, the techniques described herein relate to a mounting tool, wherein at least one of the at least a pair of support bases is permanently attached to the mounting tool.

In some aspects, according to any one of the preceding aspects, the techniques described herein relate to a mounting tool, further including a mechanism for securing the mounting tool to a hybrid manufacturing machine.

In some aspects, according to any one of the preceding aspects, the techniques described herein relate to a mounting tool, wherein the hybrid manufacturing machine to which the mounting tool is configured for securement includes each of additive manufacturing and subtractive manufacturing.

In some aspects, according to any one of the preceding aspects, the techniques described herein relate to a mounting tool, further including at least one mounting feature configured for securing the mounting tool to a hybrid manufacturing machine.

In some aspects, according to any one of the preceding aspects, the techniques described herein relate to a mounting tool, wherein the at least one mounting feature includes at least one releasable mounting feature to releasably secure the mounting tool to the hybrid manufacturing machine.

In some aspects, according to any one of the preceding aspects, the techniques described herein relate to a mounting tool, wherein at least one of the at least a pair of support bases includes a polyhedron configuration.

In some aspects, according to any one of the preceding aspects, the techniques described herein relate to a mounting tool, wherein the at least a pair of support bases are configured to align with a curvature geometry of the turbine component.

In some aspects, according to any one of the preceding aspects, the techniques described herein relate to a mounting tool, wherein the turbine component is a turbine compressor blade.

In some aspects, the techniques described herein relate to a mounting tool for use in repairing a turbine blade, the mounting tool including: a slot formed in the mounting tool, the slot configured to receive the turbine blade for securing the turbine blade to the mounting tool; at least one fastener engageable with the turbine blade and capable of retaining the turbine blade within the slot, the at least one fastener capable of being externally accessed with respect to the mounting tool for moving the at least one fastener toward and away from the turbine blade; at least a pair of support bases provided on the mounting tool, each of the at least a pair of support bases positioned adjacent a respective edge of the turbine blade when the turbine blade is retained in the mounting tool; and at least one mounting feature configured for securing the mounting tool to a hybrid manufacturing machine; wherein each of the at least a pair of support bases is configured for building a sacrificial support on each of the at least a pair of support bases for enabling repair of the turbine blade.

In some aspects, according to any one of the preceding aspects, the techniques described herein relate to a mounting tool, wherein each of the at least a pair of support bases is configured for building a sacrificial support on each of the at least a pair of support bases for supporting the turbine blade during repairing.

In some aspects, according to any one of the preceding aspects, the techniques described herein relate to a mounting tool, wherein the at least a pair of support bases are configured to align with a curvature geometry of the turbine blade.

In some aspects, according to any one of the preceding aspects, the techniques described herein relate to a mounting tool, wherein each of the at least a pair of support bases is releasably attached to the mounting tool.

In some aspects, according to any one of the preceding aspects, the techniques described herein relate to a mounting tool, wherein: the mounting tool includes x, y, and z orientations; the at least one fastener includes a fastener oriented in the y orientation and ae second fastener oriented in the z orientation of the mounting tool; and each of the fastener and the second fastener is a screw fastener.

Two or more aspects described in this disclosure, including those described in this summary section, may be combined to form implementations not specifically described herein.

DETAILED DESCRIPTION OF THE INVENTION

A gas turbine is comprised of a compressor section for compressing ambient air, a combustor section for mixing and burning fuel and the compressed air, and a turbine section driven by the expanding combustion gases for powering the compressor and turning an output shaft for ancillary devices or power generation or for providing thrust for propelling an aircraft.

Some aircraft engine components are subject to wear and tear during operation due to erosive substances, for example, sand, dust, and/or ice. In the front part of the gas turbine, the area of the compressor, erosion generally causes a flattening of the leading edges of the compressor blades. When the compressor blades are not yet worn down, they have an aerodynamically optimized profile that is detrimentally affected by the wear. As a consequence of the deterioration of the aerodynamic profile, the gas turbine loses efficiency, which means that the gas turbine needs more fuel to generate the same power. Therefore, from a financial point of view, it may be desirable to counteract the wear of compressor blades, especially a deterioration of the aerodynamically optimized blade geometries.

Repairing compressor blades, particularly ones having complex geometries, is not a simple task, however. In the prior art, larger compressor blades with simple geometries are typically repaired by first adding material to the blade (e.g., to the damaged leading edge, trailing edge, and/or the tip) using conventional techniques such as manual welding. Because the material added to the blade via such conventional techniques cannot be precisely controlled, more material than is required is typically added to the blade and the extraneous material is then removed to bring the blade within the required specifications. Such may be done when the compressor blade is large and/or has a simplistic shape. When the compressor blade is small, thin, and/or has a complex shape (e.g., curves in the X, Y, and Z planes), however, such removal of additional material to bring the blade within its required specifications is virtually impossible or at least very difficult. When material is removed from the blade, the small/thin compressor blade vibrates and precludes precise repair. Further, the complex shapes of such compressor blades make repair (e.g., milling of the excess material) unduly laborious. In view of such considerations, damaged or worn compressor blades are typically simply scrapped, especially where the blade is small in size and/or its geometry is complex.

Embodiments of dimensional compressor blade repair systems and methods disclosed herein may allow for compressor blades, including small compressor blades having complex shapes and/or geometries, to be repaired with relative ease.

Turning now to FIGS. 1 through 4, an embodiment of a blade mounting tool 100, such as but not limited to a blade mounting tool 100 (hereinafter "mounting tool 100) for use with compressor blade repair equipment is shown. The blade mounting tool 100 may be used in a method 200 (FIG. 5) of repairing a turbine blade 50, including but not limited to a HPT blade, a LPT blade, an airfoil, or a compressor blade 50 (hereinafter referred to as a "compressor blade 50"), as discussed in further detail below. The mounting tool 100 may retain (e.g., temporarily retain) a compressor blade 50 while the blade 50 undergoes repair. Portions of the blade mounting tool 100 may facilitate the construction of one or more sacrificial supports (e.g., sacrificial supports 130 and 140, see FIG. 4) that are built up as the compressor blade 50 is repaired. These sacrificial supports may stabilize the compressor blade 50 such that the blade 50 may undergo both additive and subtractive manufacturing at roughly the same time without suffering from undesirable movement or vibrations. Once the repair is completed, the sacrificial supports may be disassociated from the mounting tool 100 and the compressor blade 50, using, e.g., using electrical discharge machining or any other machining method now known or hereinafter developed.

The equipment used to add material to the compressor blade 50 may be an additive manufacturing machine, such as, but not limited to a laser sintering machine, or any other additive manufacturing machine now known or hereinafter developed. Repairing the compressor blade 50 with an additive manufacturing laser sintering machine may involve depositing a metal powder on a platform of the additive manufacturing machine, a surface of the blade 50, and/or the tool 100, and heating the metal powder together into a layer of solid material. Typically, the metal powder is heated using a laser. This additive manufacturing depositing and heating process may be repeated until a desired number of material layers are formed on the blade 50.

The compressor blade 50 may undergo further processes to complete the repair operation. For example, the compressor blade 50 may undergo a milling process where material (e.g., excess material from the additive manufacturing step) is removed from the compressor blade 50. As another example, the compressor blade 50 may undergo a surface finishing or polishing process, where material is removed from the blade 50 until a desired surface finish is reached.

In some embodiments, the step of adding material by additive manufacturing to the turbine blade 50 may occur generally at the same time as a milling process (sometimes referred to herein as "hybrid manufacturing"). This may be accomplished either with several pieces of different equipment, or with a singular piece of equipment. For instance, the compressor blade 50 may undergo repair via a piece of equipment configured for both additive manufacturing and subtractive manufacturing. An example machine that allows for such functionality is a Lumex series hybrid manufacturing machine produced by Matsuura Machinery USA Inc. of St. Paul, Minnesota. Significant time and costs may be saved by effectuating both additive and subtractive manufacturing generally simultaneously while the compressor blade is secured to the same mounting tool. Conventional compressor blade repair methods are unable to accomplish hybrid manufacturing effectively, typically because the vibrations/harmonics caused by the milling process displace the compressor blade being repaired and disrupt the additive manufacturing process.

To mitigate such displacement by vibrations/harmonics concerns, the compressor blade 50 may undergo repair while it is held by the blade mounting tool 100. A base 110 of the mounting tool 100 may have a slot 118 in which the compressor blade 50 (or a portion thereof) is situated. The compressor blade 50 may be retained within the slot 118 by one or more screws or other fasteners. For instance, a base of the compressor blade 50 may be secured within the mounting tool 100 by a screw 114 which displaces along a y-axis, and/or by a screw which displaces along a z-axis (not shown) of the mounting tool 100. The screws may be manipulated by a user via one or more apertures in the mounting tool 100. For example, the y-axis screw 114 may be accessible with a tool (e.g., a screwdriver, a hex key, a pin, etc.) via an aperture 115 in the base 110 of the mounting tool 100, while a z-axis screw may be accessed via an aperture 125 (FIG. 3) located on a bottom surface 120 of the mounting tool 100. Using the screws and the apertures 115, 125, the mounting tool 100 may be readily adjusted to secure (e.g., temporarily) compressor blades 50 of various sizes. In embodiments, the screws may alternatively or additionally be used to adjust a position of the compressor blade 50 within the mounting tool 100.

When secured in the slot 118, the compressor blade 50 may be adjacent an upright portion 112 of the mounting tool 100 that extends upwardly (i.e., in a z-axis) from the mounting tool base 110. The upright portion 112 may at least partially envelope a secured compressor blade 50 in both the x-axis and the y-axis. That is to say, the upright portion 112 may extend from the mounting tool base 110 to provide a surface 113 which is located further along the compressor blade 50 in the z-axis. In embodiments, the surface 113 may be level in the x-y plane.

The blade mounting tool 100 may have one or more mounting features 122 (FIG. 3) for securing the mounting tool 100 to other equipment, such as a hybrid manufacturing machine. The mounting features 122 may be any suitable feature(s) now known or subsequently developed for securing the mounting tool 100 in place. For example, the mounting features 122 may comprise a plurality of apertures which correspond to fasteners or a platform of a hybrid manufacturing machine. The mounting features 122 may be releasable such that a user may selectively attach/detach the mounting tool 100 as desired.

The blade mounting tool 100 may have a plurality of support bases or nubs 116 (116A, 116B) extending from the upright portion 112 (e.g., from the surface 113 thereof). These support bases 116 may protrude from the mounting tool 100 in the z-axis. In operation, the support bases 116 may provide a platform or surface upon which sacrificial supports (e.g., sacrificial supports 130 and 140, see FIG. 4) may be built while the compressor blade 50 undergoes additive manufacturing. By virtue of the support bases 116 and the sacrificial supports, the compressor blade 50 may be precluded from moving undesirably during the hybrid manufacturing process, and specifically during subtractive manufacturing.

In embodiments, there may be a support base 116 adjacent each of the trailing edge and the leading edge of the compressor blade 50. These support bases 116 may not be in contact with the compressor blade 50 when the blade 50 is secured within the mounting tool 100. That is to say, the support bases 116 may be situated such that there is some space between the support bases 116 and the compressor blade 50. For example, there may be a first support base 116A located near one of the trailing edge and the leading edge of the compressor blade 50 with a first gap 117A therebetween (FIG. 1), and there may be a second support base 116B located near the other of the trailing edge and the leading edge of the compressor blade 50 with a second gap 117B therebetween. The gaps 117A, 117B may be traversed by bridges (e.g., bridges 135 and 145, see FIG. 4) which are built during additive manufacturing and extend between the sacrificial supports and the compressor blade 50. In embodiments, the gaps 117A, 117B may be about less than a hundred-thousandths of an inch wide.

The shape and geometry of the support bases 116 may, in embodiments, generally correspond to the shape and geometry of the compressor blade 50. For example, as depicted in the figures, the support bases 116 may be polyhedrons whose form mimics or follows one or more curves (e.g., x-, y-, and/or z-axis curves) of the compressor blade 50 and the edges thereof. In some embodiments, the support bases 116 may be generally V-shaped such that sacrificial supports built thereon may use relatively less material while still maintaining structural integrity. In general, the form of the support bases 116 may factor into the resulting shape of the sacrificial supports built thereupon, in which the development of sacrificial supports which follow and stabilize the compressor blade 50 as the blade 50 is built up. Where the compressor blade is tall (e.g., in the z-direction), the support bases 116 may likewise be relatively tall to ensure the sacrificial supports built thereon desirably stabilize the compressor blade during repair.

Prior to material being added to a compressor blade 50 that is secured in the mounting tool 100, a topmost edge or tip (e.g., in the z-direction) of the blade 50 may be made level with a topmost edge or surface of at least one of the support bases 116 (i.e., a top of the blade 50 may rest in the same x-y plane as a top of the supports 116). This may be accomplished by, for example, removing material from the compressor blade 50 prior to installing the blade 50 in the mounting tool 100. Alternatively, or additionally, the compressor blade 50 and support bases 116 may be made level by adjusting a position (e.g., an x-, y-, and/or z-coordinate thereof) of the blade 50 within the mounting tool 100 by manipulating the fasteners 114. Ensuring the compressor blade 50 and the support bases 116 are level in this manner may facilitate the additive manufacturing step of the repair.

In a current embodiment, the blade 50 may be secured within the tool 100 and the tip of the blade 50 may then be together with the support bases 116A and 116B such that each of the blade tip and the support bases 116A and 116B are coplanar. Material may then be added layer by layer to the blade 50 and the support bases 116A, 116B in a planar fashion. By grinding the blade 50 while it is in the tool 100 ensures that the support bases 116A and 116B, which are ground together with the blade 50, e.g., in a machining apparatus, are in the same plane after the grinding operation such that the tool 100 may thereafter be affixed to a hybrid manufacturing machine for carrying out the additive and subtractive processes.

In embodiments, one or more of the support bases 116 may be formed as part of or made integral with the mounting tool 100 (e.g., the upright portion 112 thereof). Alternatively, or additionally, in still other embodiments, one or more of the support bases 116 may be releasably attached to the blade mounting tool 100. For instance, the support bases 116 may be selectively secured to the mounting tool 100 using one or more fasteners (e.g., a screw, a bolt, a nail, a clamp, a pin, etc.). The support bases 116 may be temporarily affixed to the mounting tool 100 in this way for the building of sacrificial supports thereupon. Once hybrid manufacturing of the compressor blade 50 is complete, a user may dissociate both the blade 50 and the support bases 116 from the mounting tool 100. With the mounting tool 100 out of the way, trimming the sacrificial supports from the blade 50 may be much easier.

In embodiments where one or more of the support bases 116 are selectively attachable to the mounting tool 100, a user may readily customize the mounting tool 100 for the repair of a given compressor blade 50. That is to say, the user may swap out a first set of support bases 116 for a second set of support bases 116 which differs in geometry (e.g., shape, form, and/or size) from the first set. Such customizability may be desirable where the user wishes to repair a compressor blade 50 which has geometry that does not correspond to geometry of the first set of support bases 116. In this way, the user may adapt a single mounting tool 100 to repair a plurality of compressor blades 50 having disparate geometries by swapping out support bases 116. Furthermore, selectively attachable support bases 116 may be easy to replace when the original support bases 116 are damaged or otherwise become unsuitable for use. Attachable support bases 116 may be replaced without having to replace or repair the rest of the mounting tool 100.

Figure 1:
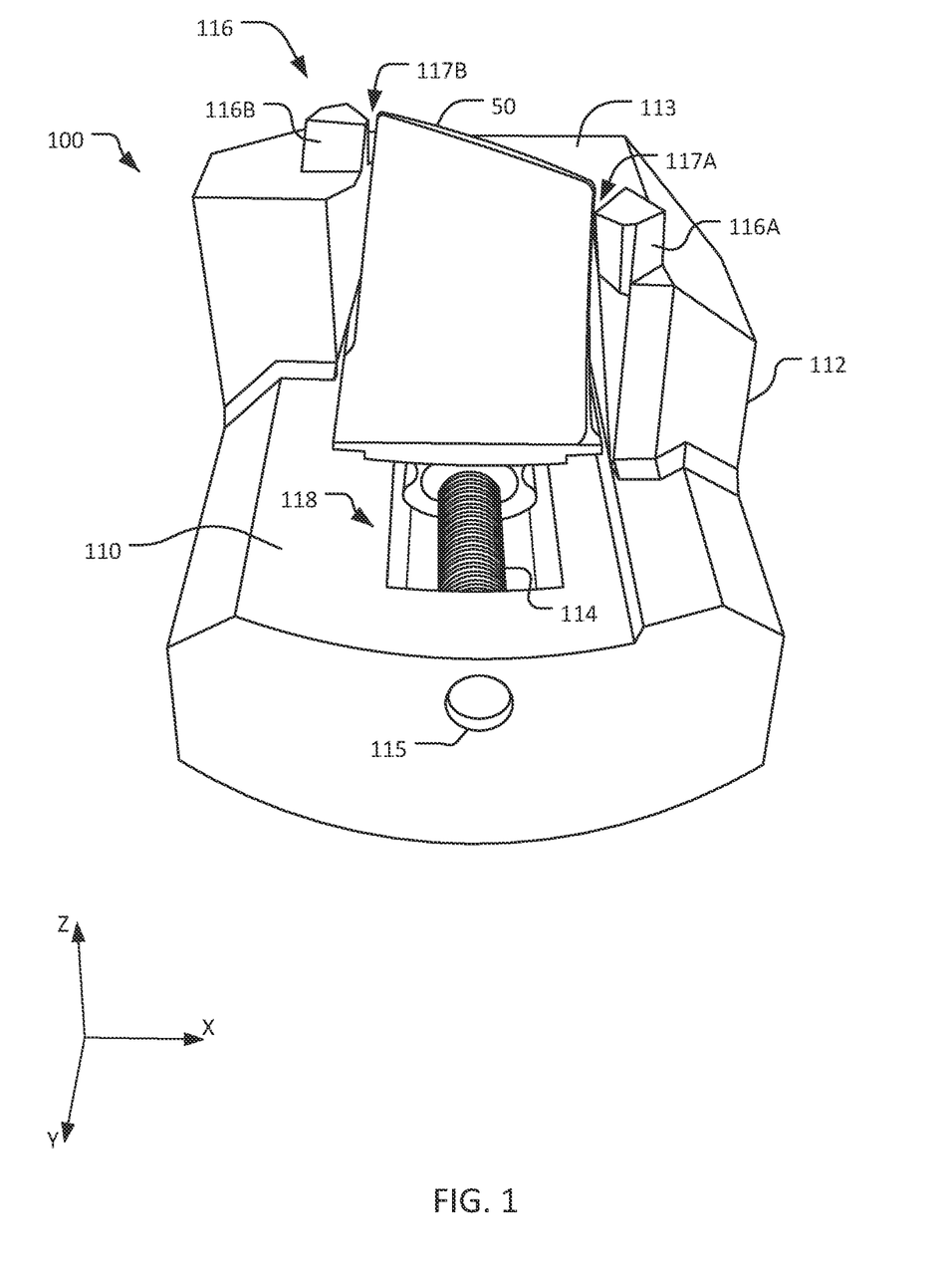
FIG. 1 is a perspective view of a mounting tool for use in repairing a compressor blade according to an embodiment of the present disclosure.
Figure 2:
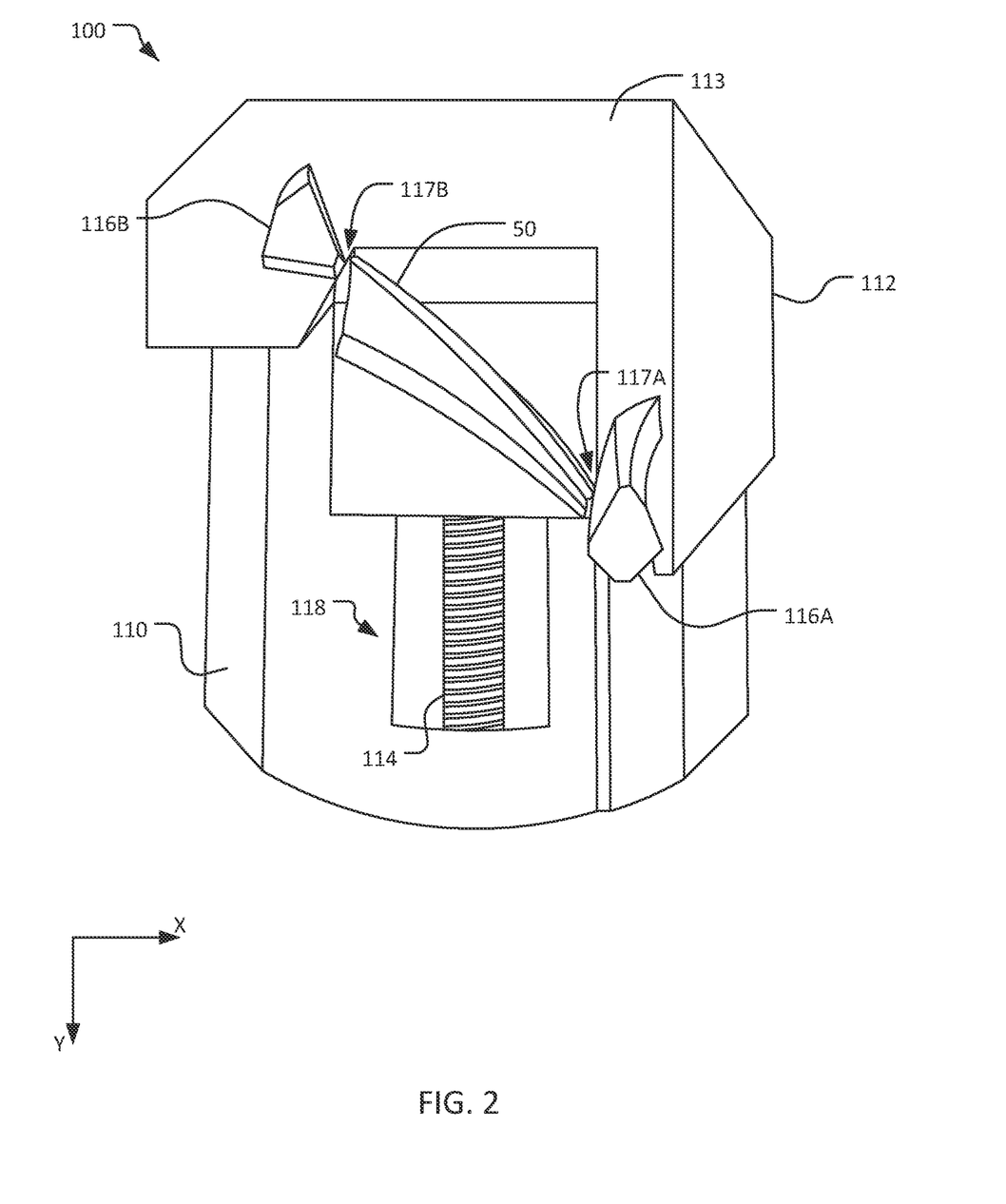
FIG. 2 is a top view of the mounting tool and an unrepaired compressor blade of FIG. 1.
Figure 3:
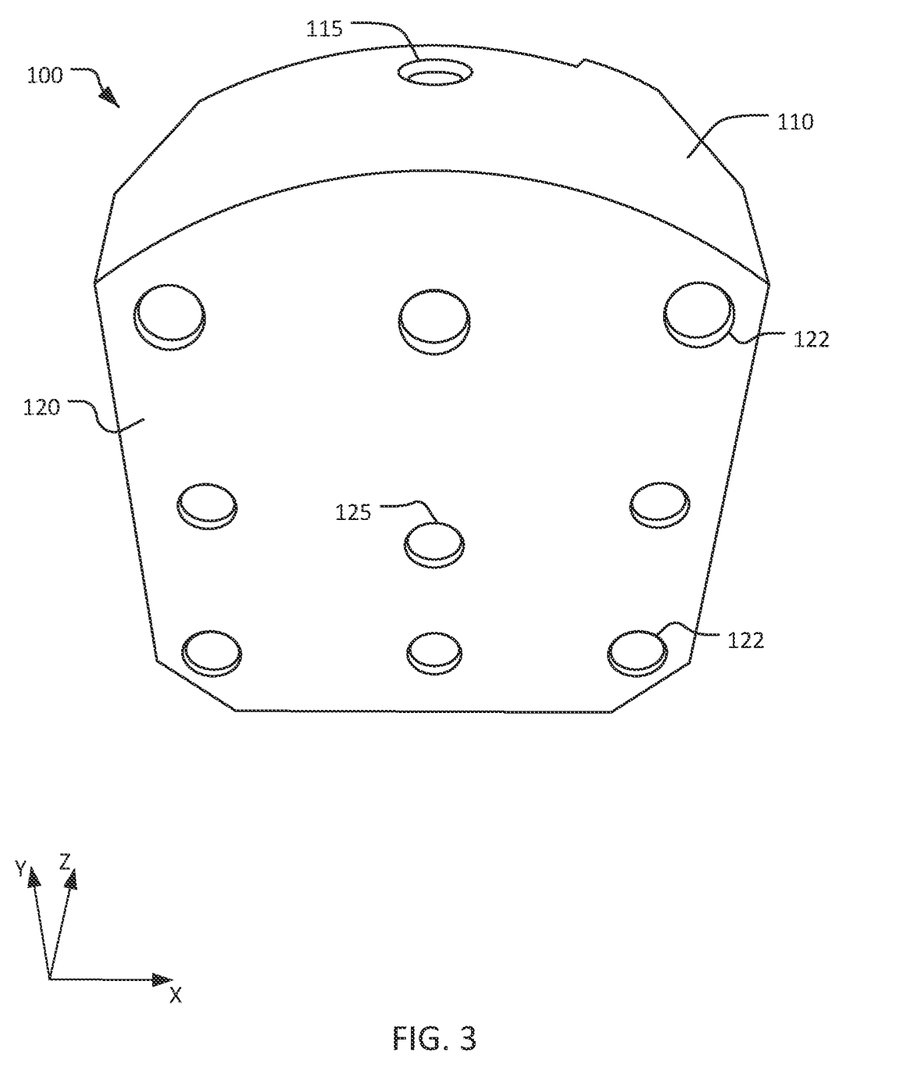
FIG. 3 is another perspective view of the mounting tool of FIG. 1.
Figure 4:
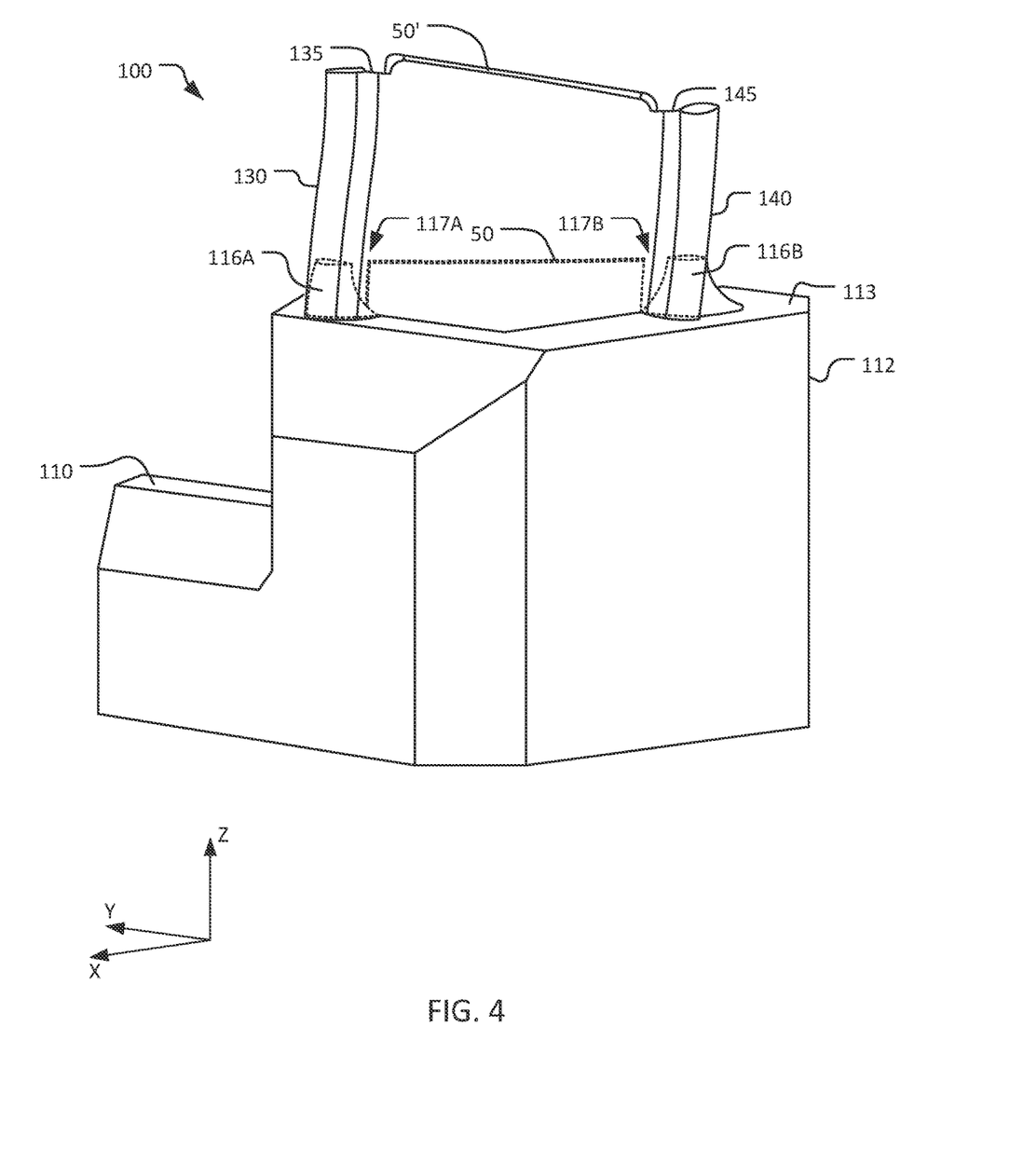
FIG. 4 is yet another perspective view of the mounting tool of FIG. 1, retaining a repaired compressor blade.

Turning now to FIG. 4, a mounting tool 100 having an example built-up (i.e., repaired) compressor blade 50' is depicted. The dashed lines show the compressor blade 50 prior to the additive manufacturing step, together with the support bases 116A and 116B underneath sacrificial supports 130 and 140, respectively. As can be seen, the sacrificial supports 130 and 140 may be built-up and attached to the leading and trailing edges of the compressor blade 50 as material is added to the blade 50. Relatively thin bridges 135, 145 of material may link the sacrificial supports 130, 140 to the compressor blade 50'. Specifically, a first bridge 135 may span the first gap 117A and couple the first sacrificial support 130 to an edge of the blade 50', and a second bridge 145 may span the second gap 117B and couple the second sacrificial support 140 to an opposing edge of the blade 50'. In this way, the sacrificial supports 130 and 140 may stabilize the compressor blade 50, enabling the blade 50 to undergo hybrid manufacturing which may not have otherwise been possible particularly where the shape of the blade 50 is complex. Once the repair of the blade 50 is complete, the sacrificial supports 130, 140 may be removed by machining away the relatively thin bridges 135 and 145.

In embodiments, the geometry of the sacrificial supports 130 and 140 may correspond to the geometry of the repaired blade 50'. That is to say, the sacrificial supports 130, 140 may be built up in the x-, y-, and/or z-direction to mimic or follow the various complex curves of the compressor blade 50. This matching of blade 50 geometry may be facilitated by the geometry of the support bases 116 on which the sacrificial supports 130, 140 are built.

Figure 5:
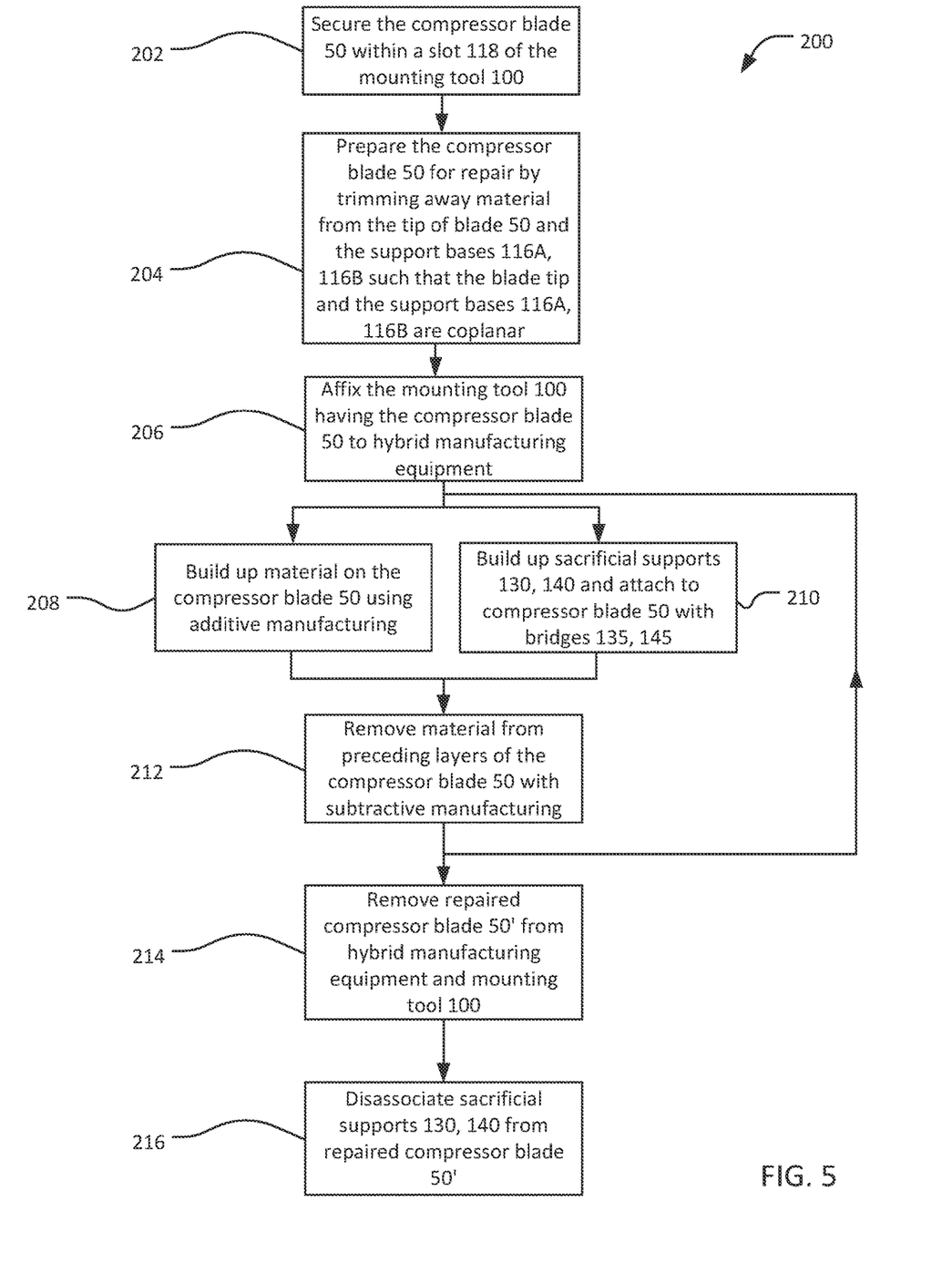
FIG. 5 is a flow diagram depicting a method of repairing a compressor blade using the mounting tool of FIG. 1, according to an embodiment of the present disclosure.

FIG. 5 is a flowchart illustrating an example method 200 of repairing a compressor blade (e.g., a compressor blade having complex geometry) using the compressor blade mounting tool embodiments disclosed herein.

First, at step 202, the compressor blade 50 may be coupled to the mounting tool 100. The compressor blade 50 may be secured within the tool 100 by placing the blade 50 within the slot 118 and using the one or more fasteners 114 to hold the blade 50 in place. The position of the blade 50 within the mounting tool 100 may be adjusted here using the fasteners 114 to, for instance, align the blade 50 with the support bases 116.

At step 204, the compressor blade 50 may be prepped for repair by grinding the tip of the blade 50 and the support bases 116A, 116B together (e.g., via a machining apparatus or other means) such that the support bases 116A, 116B and the blade tip are in the same plane. In other embodiments, material may be removed from the blade 50 while it is outside the tool 100, and the support bases may be ground separately if required, to ensure that the blade tip, once the blade 50 is secured within the tool 100, is in the same plane as the support bases 116A, 116B.

Then, at step 206, once the blade tip and the support bases 116A, 116B are coplanar, the mounting tool 100 and the blade 50 retained therein may be arranged in hybrid manufacturing equipment or machinery. The mounting features 122 of the mounting tool 100 may be used to affix the blade mounting tool 100 to the machinery.

At step 208, additive manufacturing may be used to add material (e.g., in layers) to the compressor blade 50. The additive manufacturing process used may be, for example, laser sintering, where metal powder is deposited on the blade 50 and heated with a laser to form a solid layer. This process may be repeated until a desired amount of material is deposited or a desired number of layers are formed. At step 210, additive manufacturing may be used to build sacrificial supports 130 and 140 and link the supports 130, 140 to the blade 50 via bridges 135, 145. The sacrificial supports 130, 140 may begin on the support bases 116, and the geometry the sacrificial supports 130, 140 may correspond to the geometry of the blade 50 as the blade 50 is built-up. This step may occur generally at the same time as the step of adding material to the compressor blade 50 (i.e., the blade 50, sacrificial supports 130, 140, and the bridges 135, 145 may be built-up generally simultaneously). That is, layers of the blade 50 at step 208, and layers of the sacrificial supports 116A and 116B and bridges 135, 145 at step 210, may generally be formed together.

Next, at step 212, a subtractive manufacturing process may be used to remove material from the blade 50. This may be accomplished via, for example, milling of the blade 50 (e.g., to remove a specific amount of material, to achieve certain blade 50 dimensions, to finish or polish a surface of the blade 50, etc.). This subtractive manufacturing step may overlap the steps of adding material to the blade 50, the sacrificial supports 130, 140, and the bridges 135, 145. That is to say, while material layers are being added to the blade 50 (step 208), hybrid manufacturing equipment may remove material from preceding layers (i.e., the subtractive process "follows" the additive process). The steps of adding material to and removing material from the blade 50 may be carried out by a singular device configured for hybrid manufacturing. The step of removing material may finish after the steps of adding material have already been completed. The compressor blade 50 may be stabilized and precluded from undue movement during this process by the sacrificial supports 130 and 140.

In embodiments, and as is clear from the flowchart (specifically, from the arrow looping back from step 212 to steps 208/210), at least part of the subtractive process at step 212 may follow at least part of additive processes at steps 208/210 and at least part of the additive processes at steps 208/210 may likewise follow at least part of the subtractive process at step 212. For instance, where two layers of material are to be added, layer 1 may first be formed in steps 208/210 and machined thereafter in step 212, and the method 200 may loop back to step 208/212 for the formation of layer 2 and then to step 212 for the machining of layer 2. The additive steps 208/210 and the substrative step 212 may be repeated in like manner until the repair of the blade 50 is completed.

Next, at step 214, the repaired compressor blade 50' may be removed from the hybrid machinery and dissociated from the mounting tool 100. Then, at step 216, the sacrificial supports 130, 140 may be removed from the repaired compressor blade 50' via machining (e.g., electrical discharge machining). The relatively thin bridges 135 and 145 may be exploited to facilitate this process. Once removed, the repaired turbine blade 50' may undergo any suitable finishing processes, such as machining to clean up the areas where the blade 50' was attached to the sacrificial supports 130, 140.

The artisan will understand that the steps of the method 200 may be readily omitted, added to, and/or modified to implement the various embodiments of the compressor blade mounting tool system described herein. For example, the steps of replacing the support bases 116 with a second set of support bases 116 having a disparate geometry, and then using the second set of support bases 116 to repair a second turbine blade 50 may be added. As yet another example, the step of detaching the support bases 116 from the mounting tool 100 after the blade 50 is repaired may be added in embodiments having support bases 116 that are removably attached to the mounting tool 100. As still another example, the steps of securing the compressor blade 50 in the mounting tool 100 and securing the mounting tool 100 to the hybrid machinery may be carried out in a different order.

In an embodiment, the tool 100 may be modified to allow for the repair of multiple blades simultaneously. For example, a tool having multiple slots each having associated therewith a pair of support bases may be provided to allow for the securement and repair of a plurality of compressor blades at the same time. In this embodiment, all the support bases and blade tips may first be ground such that they are coplanar (e.g., all the blades and the support bases may be ground such that the blades and support bases have a height equal to the height of the shortest blade). This tool, together with the plurality of compressor blades secured thereto, may then be associated with a hybrid manufacturing machine to allow for the additive and subtractive manufacturing to be employed for the simultaneous repair of each of the blades. Repairing multiple blades in the same tool at the same time (e.g., repairing multiple compressor blades from the same engine) may further reduce the costs and time associated with the repair relative to repairing only a solitary blade in each tool.

Thus, as has been described, the mounting tool 100 may facilitate repair of compressor blades having complex geometry (and other blades) by enabling the use of both additive and subtractive manufacturing processes to repair the blade 50 while the blade 50 is coupled to the same mounting tool 100. Without the mounting tool 100, and the support bases 116 thereof, the compressor blade 50 may undesirably move during hybrid manufacturing, thereby precluding effective repair. Furthermore, effectuating both subtractive and additive manufacturing generally at the same time may reduce process time significantly relative to conventional repair methods. A mounting tool 100 having releasably fixed support bases 116 may allow for a cost-effective mounting tool 100 which may be readily adapted for repairing compressor blades of varying geometry.

The artisan will understand that embodiments of the compressor blade repair mounting tool disclosed herein may include or have associated therewith electronics (e.g., hybrid manufacturing equipment). The electronics may be used to control, modify, and/or facilitate the operation of the blade repair mounting tool. In some example embodiments, processor or processors may be configured through particularly configured hardware, such as an application specific integrated circuit (ASIC), field-programmable gate array (FPGA), or the like, and/or through execution of software to allow the blade repair mounting tool and/or the hybrid manufacturing equipment to function in accordance with the disclosure herein.

While example applications (e.g., compressor blade repair) are used to illustrate the workings of the system and methods disclosed herein, the artisan will understand that the embodiments disclosed herein may be adapted to other repair applications, and that such adaptations are within the scope of the present disclosure. For example, embodiments of the disclosure herein may be adapted for turbine blade repair.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:

1. A mounting tool for use in repairing a turbine component, the turbine component including at least a first edge, an opposing second edge, and a tip, the mounting tool comprising:
   a slot formed in the mounting tool, the slot configured to receive the turbine component and to secure the turbine component to the mounting tool;
   at least one threaded fastener engageable by direct contact with the turbine component and capable of retaining the turbine component within the slot; and
   at least a first support base and a second support base on the mounting tool, the first support base facing the first edge of the turbine component and having a first gap therebetween, the second support base facing the second edge of the turbine component and having a second gap therebetween, the tip of the turbine component and an uppermost surface of each of the first support base and the second support base being coplanar to facilitate fabrication of additively-built planar layers on each of the tip and the uppermost surfaces of the first support base and the second support base;
   wherein, the uppermost surface of each of the first support base and the second support base is accessible in its entirety and is configured for additively building a respective sacrificial support thereon for enabling repair of the turbine component; and wherein at least the first support base is releasably attached to the mounting tool.

2. The mounting tool of claim 1, wherein the mounting tool includes x, y, and z orientations, and the at least one threaded fastener includes a threaded fastener oriented in the y orientation of the mounting tool.

3. The mounting tool of claim 1, wherein the at least one threaded fastener includes a screw fastener.

4. The mounting tool of claim 2, wherein the at least one threaded fastener oriented in the y orientation of the mounting tool is a screw fastener.

5. The mounting tool of claim 1, further including an aperture configured for allowing the at least one threaded fastener to be accessed.

6. The mounting tool of claim 1, further including a mechanism for securing the mounting tool to a hybrid manufacturing machine.

7. The mounting tool of claim 6, wherein the hybrid manufacturing machine includes each of additive manufacturing and subtractive manufacturing.

8. The mounting tool of claim 1, further including at least one mounting feature configured for securing the mounting tool to a hybrid manufacturing machine.

9. The mounting tool of claim 8, wherein the at least one mounting feature includes at least one releasable mounting feature releasably securing the mounting tool to the hybrid manufacturing machine.

10. The mounting tool of claim 1, wherein the turbine component is a turbine compressor blade.

11. A mounting tool for use in repairing a turbine blade, the turbine blade including at least a first edge, an opposing second edge, and a tip, the mounting tool comprising:
   a slot formed in the mounting tool, the slot configured to receive the turbine blade and to secure the turbine blade to the mounting tool;
   at least one fastener engageable with the turbine blade and capable of retaining the turbine blade within the slot;
   at least a first support base and a second support base on the mounting tool, the first support base facing the first edge of the turbine blade and having a first gap therebetween, the second support base facing the second edge of the turbine blade and having a second gap therebetween, the tip of the turbine blade and an uppermost surface of each of the first support base and the second support base being coplanar to facilitate fabrication of additively-built planar layers on each of the tip and the uppermost surfaces of the first support base and the second support base; and
   at least one mounting feature configured for securing the mounting tool to a hybrid manufacturing machine;
   wherein the uppermost surface of each of the first support base and the second support base is accessible in its entirety and is configured for additively building a respective sacrificial support thereon for enabling repair of the turbine blade;
   wherein each of the first and the second support bases is releasably attached to the mounting tool.

12. The mounting tool of claim 11, wherein each of the first and the second support bases is configured to align with a curvature geometry of the turbine blade.

13. The mounting tool of claim 11, wherein:
   the mounting tool includes x, y, and z orientations; and
   the at least one fastener includes a fastener oriented in the y orientation.

14. A mounting tool for use in repairing a turbine component, the turbine component including at least a first edge, an opposing second edge, and a tip, the mounting tool comprising:
   a slot formed in the mounting tool, the slot configured to receive the turbine component and to secure the turbine component to the mounting tool;
   at least one threaded fastener engageable by direct contact with the turbine component and capable of retaining the turbine component within the slot; and
   at least a first support base and a second support base on the mounting tool, the first support base facing the first edge of the turbine component and having a first gap therebetween, the second support base facing the second edge of the turbine component and having a second gap therebetween, the tip of the turbine component and an uppermost surface of each of the first support base and the second support base being coplanar to facilitate fabrication of additively-built planar layers on each of the tip and the uppermost surfaces of the first support base and the second support base;
   wherein, the uppermost surface of each of the first support base and the second support base is accessible in its entirety and is configured for additively building a respective sacrificial support thereon for enabling repair of the turbine component;
   wherein each of the first support base and the second support base is releasably attached to the mounting tool.

15. The mounting tool of claim 14, wherein the mounting tool includes x, y, and z orientations, and the at least one threaded fastener includes a threaded fastener oriented in the y orientation of the mounting tool.

16. The mounting tool of claim 14, wherein the at least one threaded fastener includes a screw fastener.

17. The mounting tool of claim 15, wherein the at least one threaded fastener oriented in the y orientation of the mounting tool is a screw fastener.

18. The mounting tool of claim 14, further including an aperture configured for allowing the at least one threaded fastener to be accessed.

19. The mounting tool of claim 14, further including a mechanism for securing the mounting tool to a hybrid manufacturing machine.

20. The mounting tool of claim 19, wherein the hybrid manufacturing machine includes each of additive manufacturing and subtractive manufacturing.

21. The mounting tool of claim 14, further including at least one mounting feature configured for securing the mounting tool to a hybrid manufacturing machine.

22. The mounting tool of claim 21, wherein the at least one mounting feature includes at least one releasable mounting feature releasably securing the mounting tool to the hybrid manufacturing machine.

23. The mounting tool of claim 14, wherein the turbine component is a turbine compressor blade.

* * * * *